(12) United States Patent
Okubo

(10) Patent No.: US 10,957,006 B2
(45) Date of Patent: Mar. 23, 2021

(54) INFORMATION PROCESSING DEVICE AND METHOD OF CONTROLLING SAME, AND NON-TRANSITORY COMPUTER READABLE MEDIUM

(71) Applicant: CANON KABUSHIKI KAISHA, Tokyo (JP)

(72) Inventor: Yuzuru Okubo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/413,786

(22) Filed: May 16, 2019

(65) Prior Publication Data

US 2019/0362459 A1 Nov. 28, 2019

(30) Foreign Application Priority Data

May 24, 2018 (JP) .............................. JP2018-099796

(51) Int. Cl.
*G06T 1/20* (2006.01)
*G06T 1/60* (2006.01)
*G06T 15/80* (2011.01)

(52) U.S. Cl.
CPC ................ *G06T 1/20* (2013.01); *G06T 1/60* (2013.01); *G06T 15/80* (2013.01)

(58) Field of Classification Search
CPC . G06F 8/41; G06F 8/443; G06F 8/447; G06T 15/80; G06T 1/20; G06T 1/60
See application file for complete search history.

(56) References Cited

U.S. PATENT DOCUMENTS

| | | | |
|---|---|---|---|
| 8,379,035 B2 | 2/2013 | Boland et al. | |
| 9,569,811 B2* | 2/2017 | Gruber | G06T 15/005 |
| 2017/0109210 A1* | 4/2017 | Goossens | G06F 8/44 |
| 2017/0115975 A1* | 4/2017 | Rose | G06F 9/541 |

FOREIGN PATENT DOCUMENTS

JP 4922367 B2 4/2012

* cited by examiner

*Primary Examiner* — Sing-Wai Wu
(74) *Attorney, Agent, or Firm* — Rossi, Kimms & McDowell LLP

(57) ABSTRACT

An information processing device including a GPU comprises: a retrieval unit that retrieves an instruction set including a first source code block, a plurality of second source code blocks obtained by tuning the first source code block for each of a plurality of GPUs of different types, and attribute information of the GPUs respectively corresponding to the plurality of second source code blocks; a selection unit that selects, from among the first source code block and the plurality of second source code blocks included in the instruction set, a source code block to be executed by the GPU on a basis of attribute information of the GPU; a compilation unit that compiles the selected source code block into a data format that can be interpreted by the GPU; and a control unit that causes the GPU to execute compiled code.

5 Claims, 10 Drawing Sheets

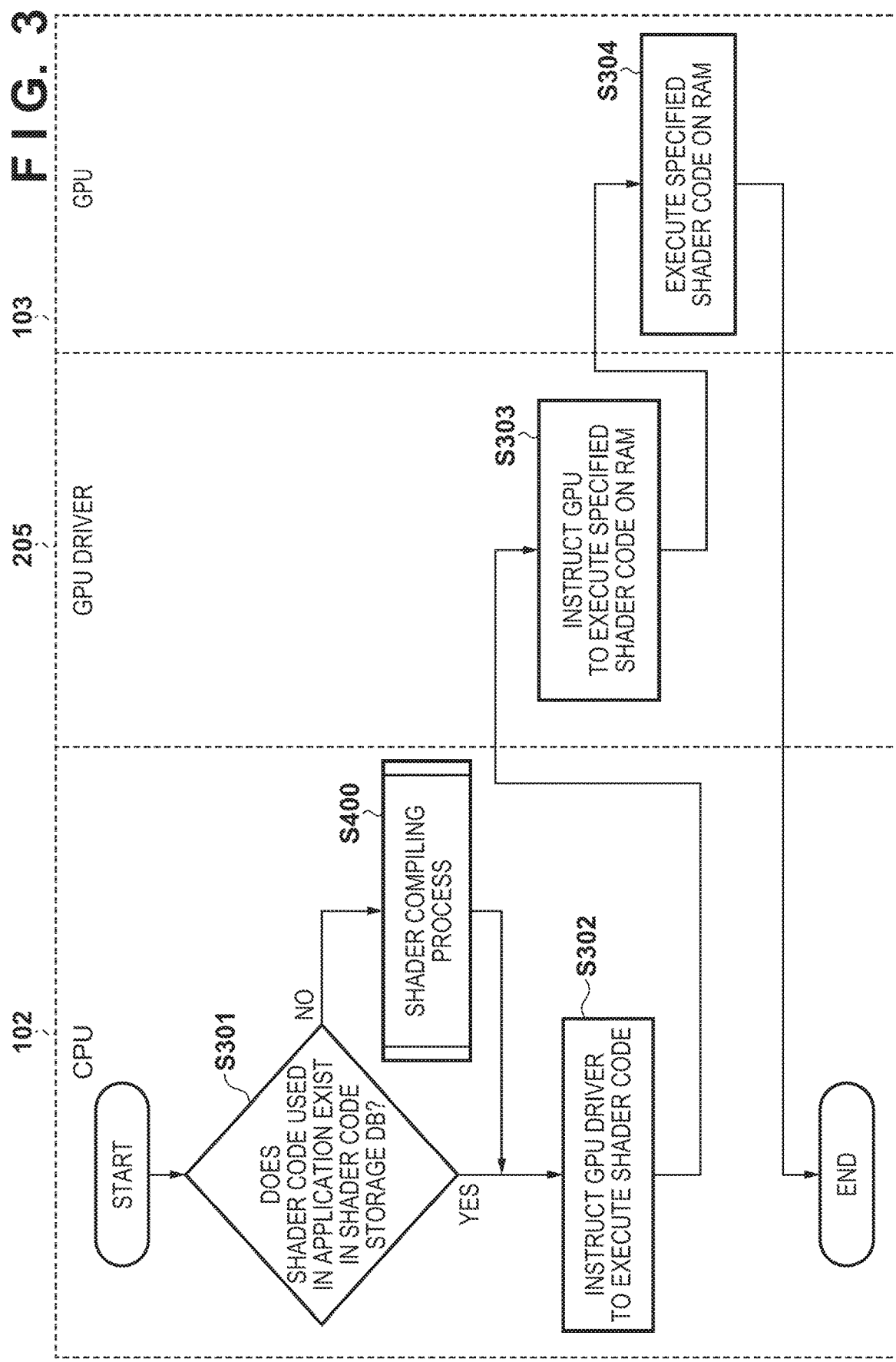

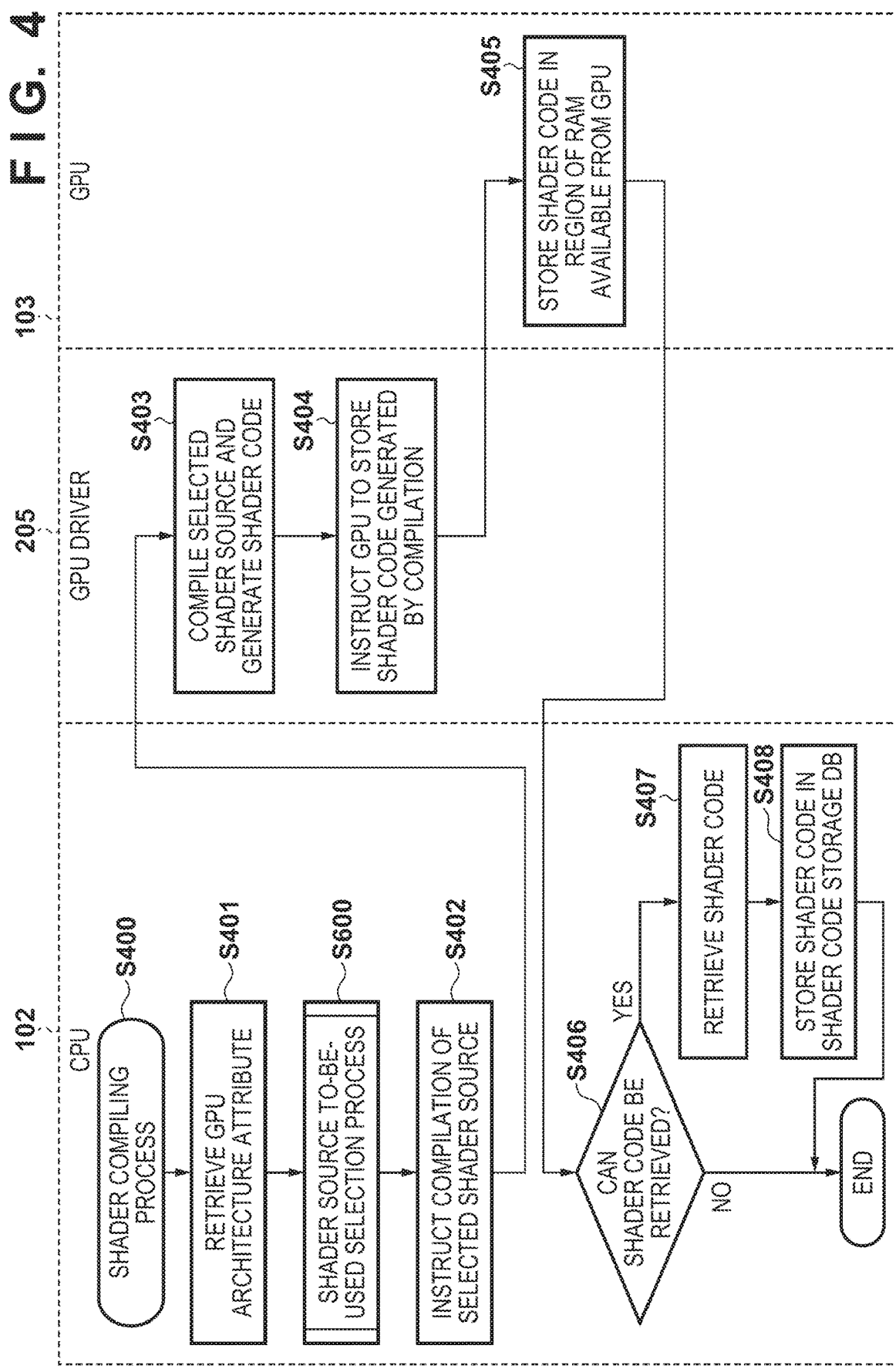

FIG. 5

SHADER SOURCE STORAGE DB 208

| TUNING ID | | | 1 | 2 | 3 |
|---|---|---|---|---|---|
| SHADER SOURCE | | | TUNED SHADER SOURCE 1 | TUNED SHADER SOURCE 2 | TUNED SHADER SOURCE 3 |
| GPU ARCHITEC-TURE ATTRIBUTE | | VENDOR | A COMPANY | A COMPANY | B COMPANY |
| | | RENDERER | GENERATION a | GENERATION b | GENERATION 1 |
| | | API VERSION | 1.0 | 1.1 | 1.0 |
| | | SHADER LANGUAGE VERSION | 2.0 | 2.0 | 1.1 |
| | EXPANSION FUNCTION | EXPANSION FUNCTION 1 | Support | Support | Not Support |
| | | EXPANSION FUNCTION 2 | Not Support | Support | Not Support |
| | | ... | ... | ... | ... |
| | TEXTURE FORMAT | TEXTURE FORMAT A | Support | Support | Support |
| | | TEXTURE FORMAT B | Support | Support | Not Support |
| | | ... | ... | ... | ... |

INFORMATION PROCESSING DEVICE AND METHOD OF CONTROLLING SAME, AND NON-TRANSITORY COMPUTER READABLE MEDIUM

BACKGROUND OF THE INVENTION

Field of the Invention

The present invention relates to an information processing device and a method of controlling the same, and a computer readable medium.

Description of the Related Art

Conventionally, techniques for operating, at higher speeds, machine language code that operates on a graphics processing unit (GPU) dedicated to image processing have been proposed (e.g., Japanese Patent No. 4922367).

Meanwhile, in distribution forms of applications to smartphones, which are currently mainstream, the terminals to which the applications can be distributed are limited based on the version of the operating system (OS) and the like. In contrast, it is difficult to know all characteristics of GPUs (GPU vendor, GPU chip type, etc.) mounted on respective smart phones, and as such it is generally not common to limit the terminal to which an application can be distributed in consideration of GPU characteristics. Consequently, in a conventional technique dependent on GPU characteristics such as that disclosed in Japanese Patent No. 4922367, it is difficult to achieve a high speed suitable for the configuration of each smartphone to which the application is distributed.

In addition, when source code optimized for a specific GPU is compiled and executed by a different GPU, processing may become slow and inefficient as compared to a case where unoptimized source code is executed.

SUMMARY OF THE INVENTION

In view of such circumstances, the present invention allows for faster processing on a GPU in a case where characteristics of the GPU of an application distribution destination is not determined in advance.

According to one aspect of the present invention, there is provided an information processing device including a Graphics Processing Unit (GPU), the information processing device comprising: a retrieval unit configured to retrieve an instruction set including a first source code block, a plurality of second source code blocks obtained by tuning the first source code block for each of a plurality of GPUs of different types, and attribute information of the GPUs respectively corresponding to the plurality of second source code blocks; a selection unit configured to select, from among the first source code block and the plurality of second source code blocks included in the instruction set, a source code block to be executed by the GPU on a basis of attribute information of the GPU; a compilation unit configured to compile the source code block selected by the selection unit into a data format that can be interpreted by the GPU; and a control unit configured to cause the GPU to execute code compiled by the compilation unit.

According to another aspect of the present invention, there is a method of controlling an information processing device including a Graphics Processing Unit (GPU), the method comprising: retrieving an instruction set including a first source code block, a plurality of second source code blocks obtained by tuning the first source code block for each of a plurality of GPUs of different types, and attribute information of the GPUs respectively corresponding to the plurality of second source code blocks; selecting, from among the first source code block and the plurality of second source code blocks included in the instruction set, a source code block to be executed by the GPU on a basis of attribute information of the GPU; compiling the source code block selected by the selecting into a data format that can be interpreted by the GPU; and causing the GPU to execute code compiled by the compiling.

According to another aspect of the present invention, there is a non-transitory computer readable medium storing a program, the program being configured to cause a computer including a Graphics Processing Unit (GPU) to function as: a retrieval unit configured to retrieve an instruction set including a first source code block, a plurality of second source code blocks obtained by tuning the first source code block for each of a plurality of GPUs of different types, and attribute information of the GPUs respectively corresponding to the plurality of second source code blocks; a selection unit configured to select, from among the first source code block and the plurality of second source code blocks included in the instruction set, a source code block to be executed by the GPU on a basis of attribute information of the GPU; a compilation unit configured to compile the source code block selected by the selection unit into a data format that can be interpreted by the GPU; and a control unit configured to cause the GPU to execute code compiled by the compilation unit.

According to the present invention, even in a case where characteristics of GPU of an application distribution destination cannot be identified in advance, it is possible to increase the speed of processing on the GPU.

Further features of the present invention will become apparent from the following description of exemplary embodiments (with reference to the attached drawings).

BRIEF DESCRIPTION OF THE DRAWINGS

FIG. 3 is a flowchart of an entirety of a process according to the present invention.

FIG. 4 is a flowchart of a shader compiling process according to a First Embodiment.

FIG. 5 is a diagram illustrating an exemplary configuration of data of a shader source storage DB according to the present invention.

DESCRIPTION OF THE EMBODIMENTS

Embodiments of the present invention are described below with reference to the accompanying drawings. Note that the embodiments do not limit the present invention, and all the configurations described in the embodiments are not necessarily essential for solving the problems of the present invention.

First Embodiment

Hardware Configuration

An example of the information processing device according to the present embodiment is described below with an information processing apparatus 100 as an example.

Figure 1:
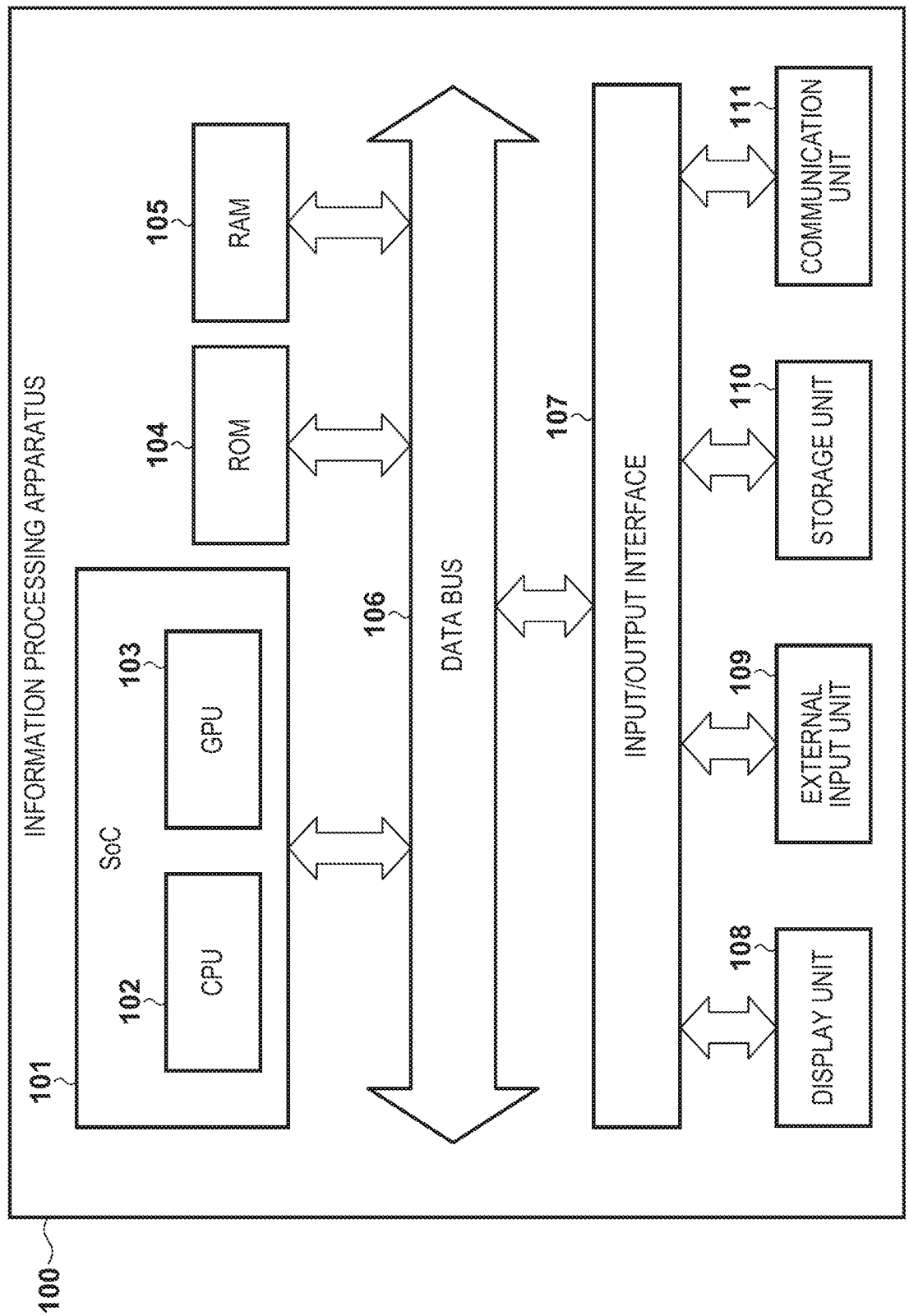
FIG. 1 illustrates an exemplary hardware configuration of an information processing device according to the present invention.

FIG. 1 is a block diagram illustrating an exemplary hardware configuration of the information processing apparatus 100. The information processing apparatus 100 includes a System on a Chip (SoC) 101, a Read Only Memory (ROM) 104, a Random Access Memory (RAM) 105, a display 108, an external input unit 109, a storage unit 110, and a communication unit 111. The SoC 101 includes a Central Processing Unit (CPU) 102 and a GPU 103. The units are communicatively connected to each other via a data bus 106 and an input/output interface 107.

The present embodiment is described assuming that the information processing apparatus 100 is a small portable terminal such as a smart phone and a tablet. However, the information processing apparatus 100 may be a common laptop or desktop computer as long as the information processing apparatus 100 has a similar configuration. Further, a client-server configuration may be adopted in which the information processing apparatus 100 functions as a client, receives a program (application) via a network from a server (not illustrated) that is an external device, and executes the received program.

The SoC 101 is configured to have multiple different functions on one integrated circuit chip. In the present embodiment, the SoC 101 includes the Central Processing Unit (CPU) 102 and the Graphics Processing Unit (GPU) 103, but may include other functions, such as a wireless baseband processing unit.

The CPU 102 executes programs stored in the storage unit 110, the ROM 104, or the RAM 105 to perform various processes provided in the information processing apparatus 100. In other words, the program stored in the storage unit 110 and the like includes code for causing the CPU 102 to perform processing in the information processing apparatus 100 according to the present embodiment. The code include a program for the OS, an application program, a driver program for controlling hardware, and the like.

The GPU 103 is a processing unit dedicated to real-time image processing (drawing processing), and is superior to the CPU 102 in terms of parallel processing. For example, the GPU 103 can perform processing of the same content by parallel processing using different parameters to perform the image processing. The GPU 103 can execute a program dedicated to the GPU 103 (hereinafter referred to as shader code). The shader code is a machine language sequence (data format) that can be directly interpreted by the GPU 103. The machine language sequence that can be directly interpreted by the GPU 103 is based on an instruction set that can be interpreted by the GPU 103.

The ROM 104 is a non-volatile memory provided inside the information processing apparatus 100. A program that can be executed by the CPU 102 and source code for the GPU 103 (hereinafter, shader source) are stored therein.

Differences between the shader code and the shader source are described in more detail below. The shader code is an instruction sequence that can be interpreted by the GPU 103. Such a sequence that "can be interpreted" may be a machine language sequence that can be directly executed by the GPU 103, or an instruction sequence that can be handled by the GPU 103 as intermediate code and can be converted into a directly executable machine language sequence prior to execution. The shader source is source code described by a shader language defined by the API standard (e.g., OpenGL (trademark) ES) for controlling the GPU 103. The shader language is not limited. Shader code can be generated when shader source is compiled by a given compiler corresponding to the shader language. Examples of the type of the shader include a vertex shader, a fragment shader, and the like.

A difference between the shader source and the shader code is that the shader code can be directly executed by the GPU 103 whereas the shader source cannot be directly executed by the GPU 103. In addition, the description of the shader code is dependent on the GPU 103 (and the compiler that has performed the compiling), and generally, shader code that has been compiled by a compiler of a certain GPU 103 is not guaranteed to operate in another GPU 103. Another difference is that the shader source can be used as long as the GPU compiler supports the shader language used for the description, and the number of GPUs that can operate the shader source is larger than that of the shader code. In other words, the number of the types of GPUs that can execute the shader source is larger than that for the shader code, and the versatility of the shader source is greater than that of the shader code.

The RAM 105 is a readable-and-writable volatile memory that stores various types of information, and is used also as a work area of the CPU 102. For example, the CPU 102 loads the program stored in the ROM 104 or the storage unit 110 into the RAM 105 to execute the program. Note that all or some of the functions of the information processing apparatus 100 and the processing according to the sequence described below may be implemented using dedicated hardware. In addition, in the present embodiment, the RAM 105 is configured not to be included in the SoC 101, but the RAM 105 may be included within the SoC 101 for the purpose of achieving high speed processing and the like. The RAM 105 may be configured such that only the region for the GPU 103 is included in the SoC 101.

The data bus 106 is wiring used to connect the units together for data communications. The input/output interface 107 controls the communication between various types of components for controlling input/output with the external device and the inside of the information processing apparatus 100. In the present embodiment, the display unit 108, the external input unit 109, the storage unit 110, and the communication unit 111 are included in the information processing apparatus 100 as units for controlling external input/output.

The display unit 108 is composed of a display such as a liquid crystal display, and displays an output result and UI about an application. The external input unit 109 accepts various inputs from a user. The external input unit 109 includes at least one input device such as a mouse, a keyboard, and a touch panel, for example. In response to the input from the user, the external input unit 109 outputs the notification information notifying the input to the CPU 102. Alternatively, the external input unit 109 directly outputs the notification information to the RAM 105.

The storage unit 110 is a non-volatile storage area, and includes at least one storage device such as a hard disk and a memory capable of storing files, programs, and the like. Alternatively, the storage unit 110 may be a removable portable medium. The communication unit 111 transmits and receives given information via an external network (not illustrated) between the information processing apparatus 100 and another information processing device. The communication unit 111 includes a communication device such as a radio module or the like that contains a network adapter and an antenna, for example. The communication unit 111 transmits, to another information processing device via the network, information output for transmission from the CPU 102 to that information processing device. The communication unit 111 receives information transmitted via the network from another information processing device, and outputs the information to the CPU 102.

Differences between the CPU 102 and the GPU 103, other than the difference between the processing capabilities, are described below. They both execute interpretable machine language code. While the instruction set for the CPU 102 is generally published, the instruction set for the GPU 103 is not necessarily published. This is because it is prescribed in the standard for controlling the GPU 103 (e.g., OpenGL ES) that the shader source is compiled on an information processing terminal that actually executes a program rather than compiling the shader source beforehand. As such, there are a wider variety of instruction sets for the GPU 103 compared to the variety of instruction sets for the CPU 102. In particular, in environments where the GPU 103 operates as long as it supports the API standard for the GPU 103 (e.g., OpenGL ES), it is very difficult to specifically determine beforehand the instruction set with which the GPU 103 operates in application development. In addition, when a plurality of shader code blocks corresponding to a plurality of GPUs of different types are included in the instruction set in order to support the GPUs, the size of the instruction set increases in accordance with the number thereof.

Software Configuration

Figure 2:
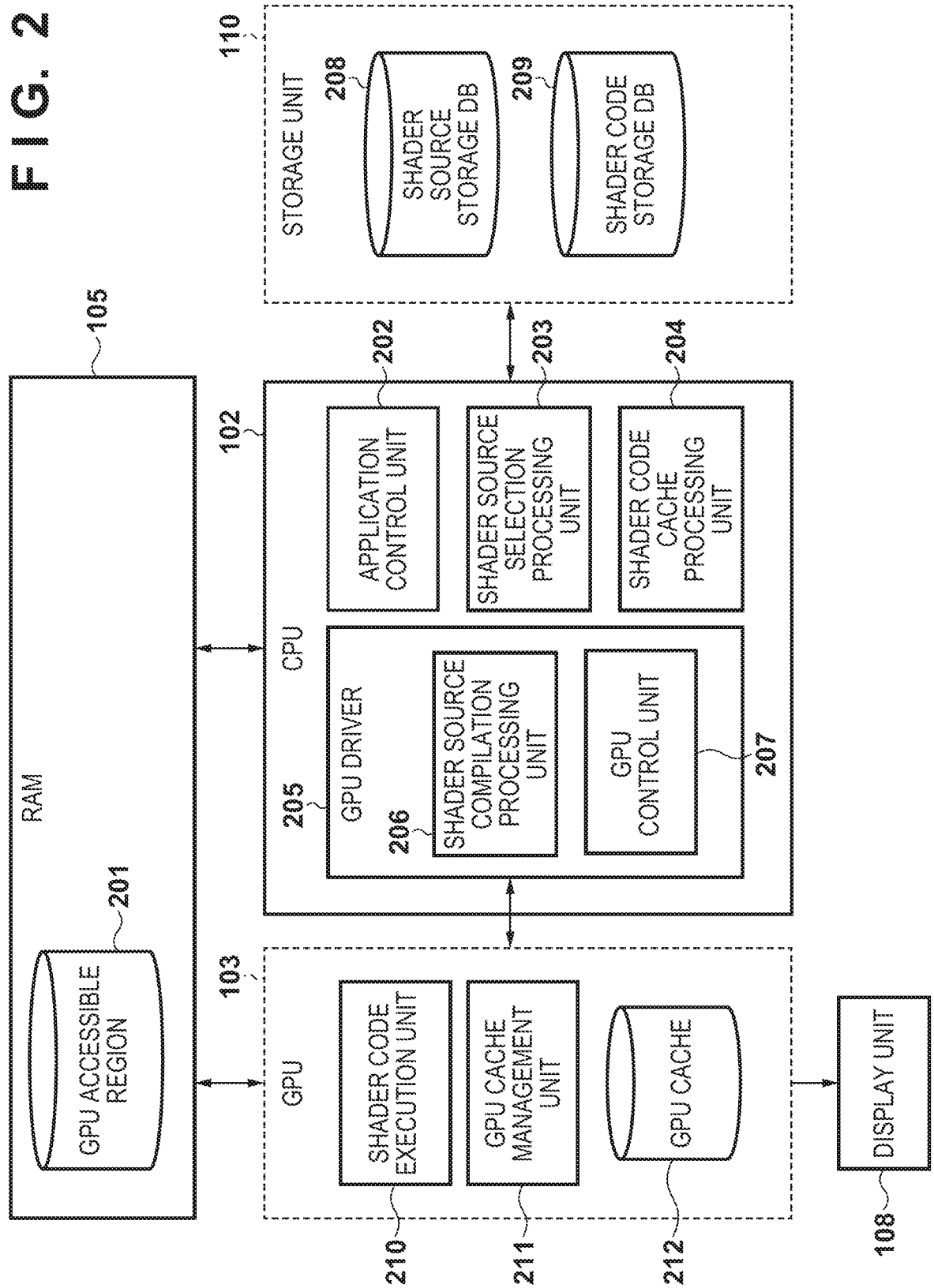
FIG. 2 illustrates an exemplary software configuration of the information processing device according to the present invention.

Next, an exemplary configuration of software that operates on hardware according to the present embodiment is described with reference to FIG. 2. The present embodiment assumes an application in which at least one image processing process or the like is executed by the GPU 103. The shader source serving as a base of the shader code for execution in the GPU 103 is assumed to be stored in the ROM 104 or in the storage unit 110. Further, shader source tuned for the GPU 103 having a different configuration, such as an instruction set to be used, is also assumed to be stored in the ROM 104 or in the storage unit 110. "Tune" here means taking a measure for performance improvement so as to operate the shader source in a certain the GPU 103 at high speed without changing the function achieved by the shader source as a base. Specific examples include changes in handling of variables suitable for the number of registers of the GPU 103, loop unwinding, and the like. Here, it is assumed that by tuning a particular shader source for a specific GPU, shader source different from the original shader source is configured. The particular GPU can provide higher performance by using the shader source tuned for the particular GPU than by pre-tuning shader source.

The description of the present embodiment is given assuming that an instruction set (such as an application) in which shader source that is not dependent on the type of GPU and shader source tuned for a specific GPU are packed together has been distributed to the information processing apparatus 100. In other words, at the point when the application is distributed, the type of the GPU included in the information processing apparatus 100 to which it is distributed is not specified. The instruction set includes information related to the GPU architecture attribute. Details of the attribute information will be described later.

The RAM 105 is provided with a GPU accessible region 201. The GPU accessible region 201 is a region the GPU 103 can read from and write to. In small terminals such as smartphones, the RAM 105 used by the CPU 102 and the GPU 103 is often shared. Therefore, in the present embodiment, a description is given in which, explicitly, there is a region in the RAM 105 that is accessible to the GPU 103. Note that this configuration is not a limitation, and a memory arrangement may be configured in which regions for the CPU 102 and the GPU 103 are mixed, or in which memories that can be individually used by the CPU 102 and the GPU 103 are separately prepared.

The CPU 102 functions as an application control unit 202, a shader source selection processing unit 203, a shader code cache processing unit 204, and a GPU driver 205. Each of these units is realized by the CPU 102 reading out and executing a corresponding program. The application control unit 202 manages and controls applications that are to be executed using the information processing apparatus 100. The shader source selection processing unit 203 selects, from among the pre-tuning shader source and the tuned shader source, shader source suitable for the GPU 103 on the information processing apparatus 100 for execution.

The shader code cache processing unit 204 makes a retrieval request to the GPU driver 205 to retrieve a compiled shader code. The shader code cache processing unit 204 stores the retrieved shader code in the nonvolatile memory (the ROM 104 or the storage unit 110) in order to skip the compiling process in the subsequent stages, and reads the stored shader code when using it. Thus, the processing load can be reduced and the processing time can be shortened.

The GPU driver 205 serves as an interface for controlling the GPU 103 from the processing unit on the CPU 102, such as the application control unit 202. The role of the GPU driver 205 includes compiling the shader source and converting the shader source to shader code, instructing the GPU 103 to execute the shader code, and the like. The shader source compilation processing unit 206 compiles the shader source and converts the shader source to the shader code. In the present embodiment, the shader source compilation processing unit 206 operates mainly on the CPU 102, but may be offloaded so as to pass a portion of the compiling process to the GPU 103. Alternatively, all of the compiling processes may be delegated to the GPU 103 only by the GPU driver 205 issuing a compilation instruction. The GPU control unit 207 controls the texture and register managed by the GPU 103, and performs the execution instruction to the GPU 103.

The storage unit 110 is provided with a shader source storage DB 208 and a shader code storage DB 209. The shader source storage DB 208 is a database that includes various information associated with the shader source and the shader source used by the application control unit 202. The specific contents of the shader source storage DB 208 are described below with reference to FIG. 5. The shader code storage DB 209 is a database used by the shader code cache processing unit 204 to store the shader code output by the shader source compilation processing unit 206 of the GPU driver 205.

The GPU 103 functions as a shader code execution unit 210 and a GPU cache management unit 211. Additionally, the GPU 103 is provided with a GPU cache 212. The shader code execution unit 210 executes shader code that can be directly interpreted by the GPU 103 in accordance with an instruction of the GPU control unit 207 by using the processing function of the GPU 103. The GPU cache management unit 211 causes the GPU cache 212, which can perform faster reading and writing than the GPU accessible region 201 of the RAM 105, to cache the shader code when the shader code execution unit 210 of the GPU 103 executes the shader code. The GPU cache 212 is a high-speed memory region that is managed by the GPU cache management unit 211 and is directly coupled to the GPU 103 for temporarily storing shader code and texture data.

Processing Sequence

Next, a processing sequence according to the present embodiment is described with reference to FIG. 3. The processing sequence is initiated upon receiving a request for display processing from a user via an application (not illustrated), for example. Here, the CPU 102, the GPU driver 205, and the GPU 103 perform processing in cooperation with each other.

At S301, the application control unit 202 confirms whether the shader code used in the application (not illustrated) is present in the shader code storage DB 209. In accordance with a confirmation that the shader code is not present in the shader code storage DB 209 (NO at S301), then it transitions to S400. When the shader code is present in the shader code storage DB 209 (YES at S301), then it proceeds to S302 by skipping a shader compiling process since the shader source to be used has already been compiled. In other words, when the shader code generated by the compiling process is stored in the shader code storage DB 209, the processing load and the processing time can be reduced by skipping the compiling process in the subsequent stages.

At S400, the shader source selection processing unit 203 selects and compiles shader source having a suitable performance from among shader source blocks of the pre-tuning shader source and the tuned shader source. Details of the shader compiling process will be described later with reference to FIG. 4. After this step is completed, it proceeds to S302.

At S302, the application control unit 202 instructs the GPU driver 205 to execute target shader code stored in the shader code storage DB 209.

At S303, the GPU control unit 207 of the GPU driver 205 instructs the GPU 103 to execute the target shader code instructed to be compiled at S302.

At S304, the GPU 103 executes the shader code specified in the instruction at the S303, at the shader code execution unit 210. Note that the shader code used in the present step is stored in the GPU accessible region 201. Then, this process flow is terminated.

Shader Compiling Process

Next, the shader compiling process is described in detail with reference to FIG. 4.

At S401, the shader source selection processing unit 203 retrieves attribute information (GPU architecture attributes) related to the GPU 103. The GPU architecture attributes include GPU vendor names, generation information for GPU chips dependent on each GPU vendor, the type of texture format and enhanced function supported by the GPU 103, and the like. The above description is not a limitation, and the maximum number and maximum resolution of the texture that can be used and the like may also be used as the GPU architecture attribute. The information about the GPU architecture attribute of the GPU 103 may be configured to be stored in advance in the ROM 104 or the like such that the CPU 102 retrieves the information, or be queried to the GPU 103 or the like via the GPU driver 205.

At S600, the shader source selection processing unit 203 selects the shader source to be used as the compile target from among shader source blocks of the pre-tuning shader source and the tuned shader source. Details of the shader source to-be-used selection process will be described later with reference to FIG. 6. After this step is completed, it proceeds to S402.

At S402, the shader source selection processing unit 203 instructs the GPU driver 205 to compile the shader source selected in the shader source to-be-used selection process (S600).

At S403, the shader source compilation processing unit 206 of the GPU driver 205 compiles the shader source of the target instructed by the shader source selection processing unit 203, and generates the shader code. At this time, in the present embodiment, the compilation of the shader source is performed by the GPU driver 205, that is, the compiling process is performed by the CPU 102 including the GPU driver 205. However, the compiling process itself may be performed by the CPU 102 and the GPU 103 in cooperation with each other, or the GPU 103 may perform all the compiling process.

At S404, the shader source compilation processing unit 206 of the GPU driver 205 instructs the GPU 103 to store the shader code generated at S403 in the GPU 103. At this time, the shader source compilation processing unit 206 passes the generated shader code to the GPU 103 together with the instruction.

At S405, the GPU 103 stores the target shader code instructed to be stored at S404 in the GPU accessible region 201 in the RAM 105.

At S406, the shader source selection processing unit 203 of the CPU 102 determines whether the shader code stored in the GPU accessible region 201 at S405 can be retrieved. Such determination is necessary because even when the shader code is stored in the RAM 105, which can also be used from the CPU 102, direct access to the GPU accessible region 201 from the CPU 102 is assumed to be prohibited. As such, the shader source selection processing unit 203 queries the GPU driver 205 whether the shader code can be retrieved, and makes a determination based on the query result. In accordance with a determination that the shader code cannot be retrieved (NO at S406), then the process flow is terminated and proceeds to S302 in FIG. 3. In accordance with a determination that the shader code can be retrieved (YES at S406), then it proceeds to S407.

At S407, the shader source selection processing unit 203 retrieves the shader code from the GPU driver 205. At this time, the GPU driver 205 retrieves the shader code from the GPU accessible region 201 of the RAM 105 via the GPU 103.

At S408, the shader source selection processing unit 203 stores the shader code retrieved at S407 in the shader code storage DB 209. Then, this process flow is terminated, and it proceeds to S302 of FIG. 3.

Exemplary Data Configuration

Next, details of the shader source storage DB 208 referenced in the shader source to-be-used selection process (S600) are described with reference to FIG. 5.

FIG. 5 illustrates a case where there are three tuned shader source blocks for a certain base shader source in the shader source storage DB 208. Each tuned shader source block is assigned with an ID (identity) for uniquely identifying each source block as a tuning ID, and in this embodiment, tuning IDs "1" to "3" are illustrated.

In addition to the tuned shader source itself, the shader source storage DB 208 includes information about the GPU 103 to be tuned, which is referred to as the GPU architecture attribute. Regarding the GPU architecture attributes, attributes for the GPU architecture that are targeted for tuning are imparted to the tuned shader source when tuning the shader source. That is, the GPU architecture attribute is prepared prior to application distribution.

Specifically, as illustrated in FIG. 5, the GPU architecture attributes may include vendors and renderers (generation information) of the GPU 103, versions of supported Application Programming Interfaces (APIs), versions of supported shader languages and the like. Further, the GPU architecture attributes may include support information for the expansion function (i.e., functions other than the core function of the API for operating the GPU). Further, the GPU architecture attributes may include texture information. Examples of the texture information include whether a texture format of a floating point number and/or an integer is supported, a maximum resolution of a supported texture format and the like.

Shader Source to-be-Used Selection Process

Figure 6:
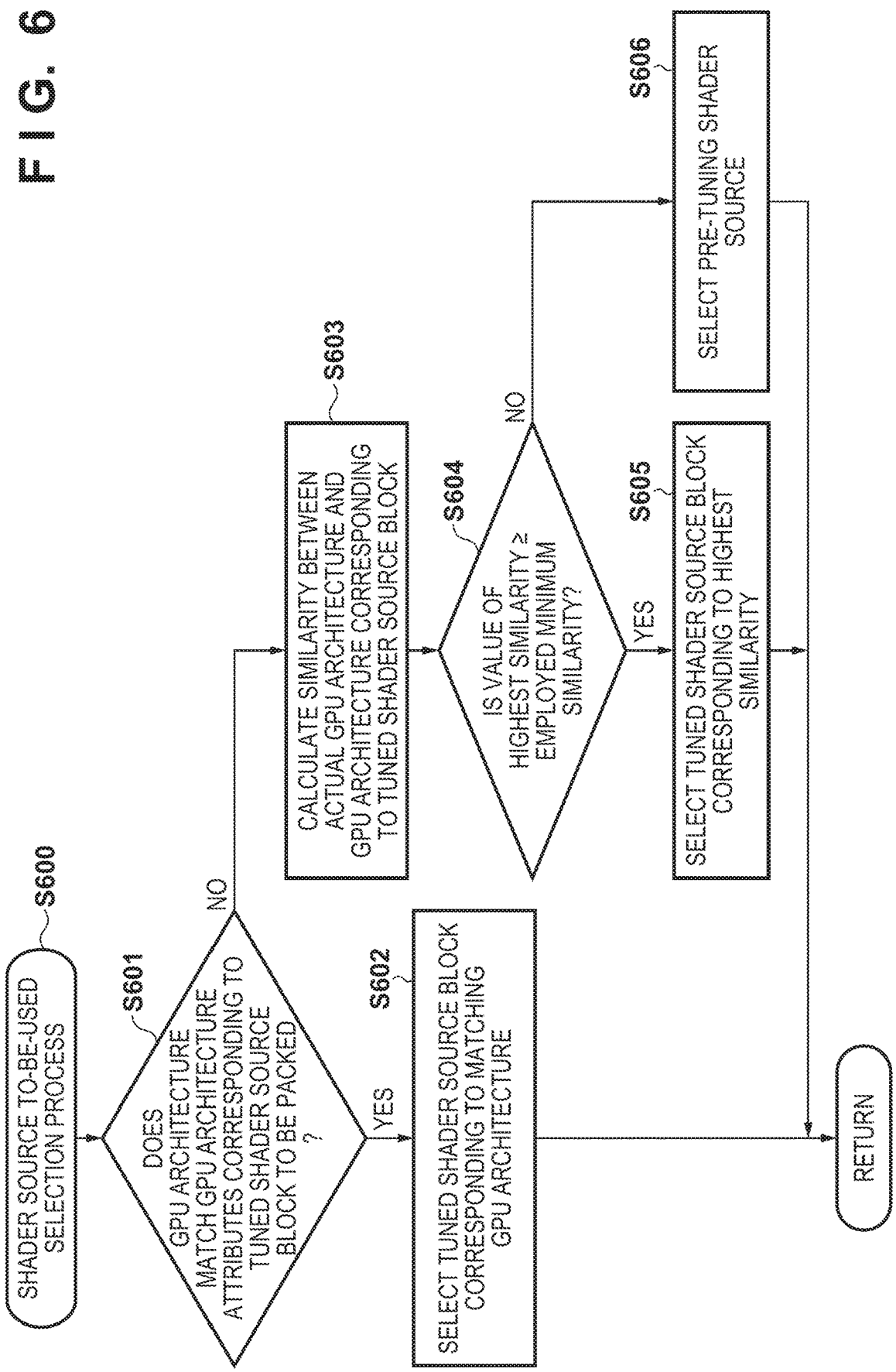
FIG. 6 is a flowchart of a shader source to-be-used selection process according to the First Embodiment.

Next, the shader source to-be-used selection process (S600) is described in detail with reference to FIG. 6.

At S601, the shader source selection processing unit 203 of the CPU 102 searches the shader source storage DB 208 for a tuned shader source block that corresponds to GPU architecture attributes that match the GPU architecture attributes of the GPU 103 included in the information processing apparatus 100 (hereinafter referred to as "actual GPU architecture attributes"). Here, a specific matching condition may be a case where all items of the GPU architecture attributes managed in the shader source storage DB 208 are completely matched. Also, as another matching condition, only the GPU 103 vendor name and the renderer name may be compared. This condition provides an effect that it is possible to handle a case where a small difference is caused with respect to the same GPU 103 by a different driver version in comparison with the condition of whether all items are perfectly matched. When a tuned shader source block corresponding to the GPU architecture attribute that matches the actual GPU architecture attribute is present in the shader source storage DB 208 (YES at S601), then it proceeds to S602. When a tuned shader source block corresponding to a matching GPU architecture attribute is not present in the shader source storage DB 208 (NO at S601), then it proceeds to S603.

At S602, the shader source selection processing unit 203 selects the tuned shader source block corresponding to the GPU architecture attributes matched at S601 as tuned shader source to be used in an application (not illustrated). Then, this process flow is terminated, and it proceeds to S402 of FIG. 4.

At S603, the shader source selection processing unit 203 calculates the similarity between the actual GPU architecture attribute and the GPU architecture attribute corresponding to the tuned shader source block. When a plurality of tuned shader source blocks are present in the shader source storage DB 208, the corresponding similarity between the actual GPU architecture attribute and the GPU architecture attribute is calculated for each tuned shader source blocks. Here, the method of calculating the similarity between GPU architecture attributes may be any method that can calculate the similarity, such as a method of calculating the correlation, a method of calculating the cosine similarity, a method of calculating the Euclidean distance, and the like. Note that the similarity calculation of the character string may be a method of comparing the type of used characters and/or a method of determining the editing distance (Levenshtein distance). Here, the details of the calculation method are omitted.

At S604, the shader source selection processing unit 203 determines whether the value of the highest similarity among the calculated similarities of the architectural attributes is equal to or greater than the employed minimum similarity. Here, it is assumed that the value of the employed similarity is defined in advance and is stored in the storage unit 110 or the like. The employed similarity is, for example, a threshold used in accordance with the calculation method and/or the number of items used in the similarity calculation. When the value of the highest similarity is equal to or greater than the employed minimum similarity (YES at S604), the shader source selection processing unit 203 proceeds to S605, and when the value is smaller than the minimum employed similarity (NO at S604), the shader source selection processing unit 203 proceeds to S606.

At S605, the shader source selection processing unit 203 selects the tuned shader source block corresponding to the highest similarity as shader source to be used in the application. Then, this process flow is terminated, and it proceeds to S402 of FIG. 4.

At S606, the shader source selection processing unit 203 selects the pre-tuning shader source as shader source to be used in the application. Then, this process flow is terminated, and it proceeds to S402 of FIG. 4.

Note that, in the present embodiment, a single shader having the same function is described. When the application uses a plurality of shader source blocks, the tuning ID determined in the compilation of a certain shader source block may be used in the compilation of other shader source blocks to skip the shader source block to-be-used selection process (S600). Alternatively, the shader selection to-be-used process (S600) may be performed for each shader source block.

Thus, according to the present embodiment, even in a case where characteristics of a GPU of the application distribution destination cannot be identified, increase in the processing speed on the GPU can be achieved.

Second Embodiment

In the shader source to-be-used selection process (S600) in the First Embodiment, a method of calculating the similarity between the actual GPU architecture attribute and the GPU architecture attribute corresponding to each packed tuned shader source block is described. However, when using a tuned shader source that is selected to improve the performance by use of the calculated similarity, the performance may be degraded than the case where the pre-tuning shader source is executed. In view of this, the present embodiment describes a method of preventing a situation where the performance is degraded due to the use of the technique of the First Embodiment while shortening the time required for the shader source selection process.

Processing Sequence

Shader Compiling Process

Figure 7:
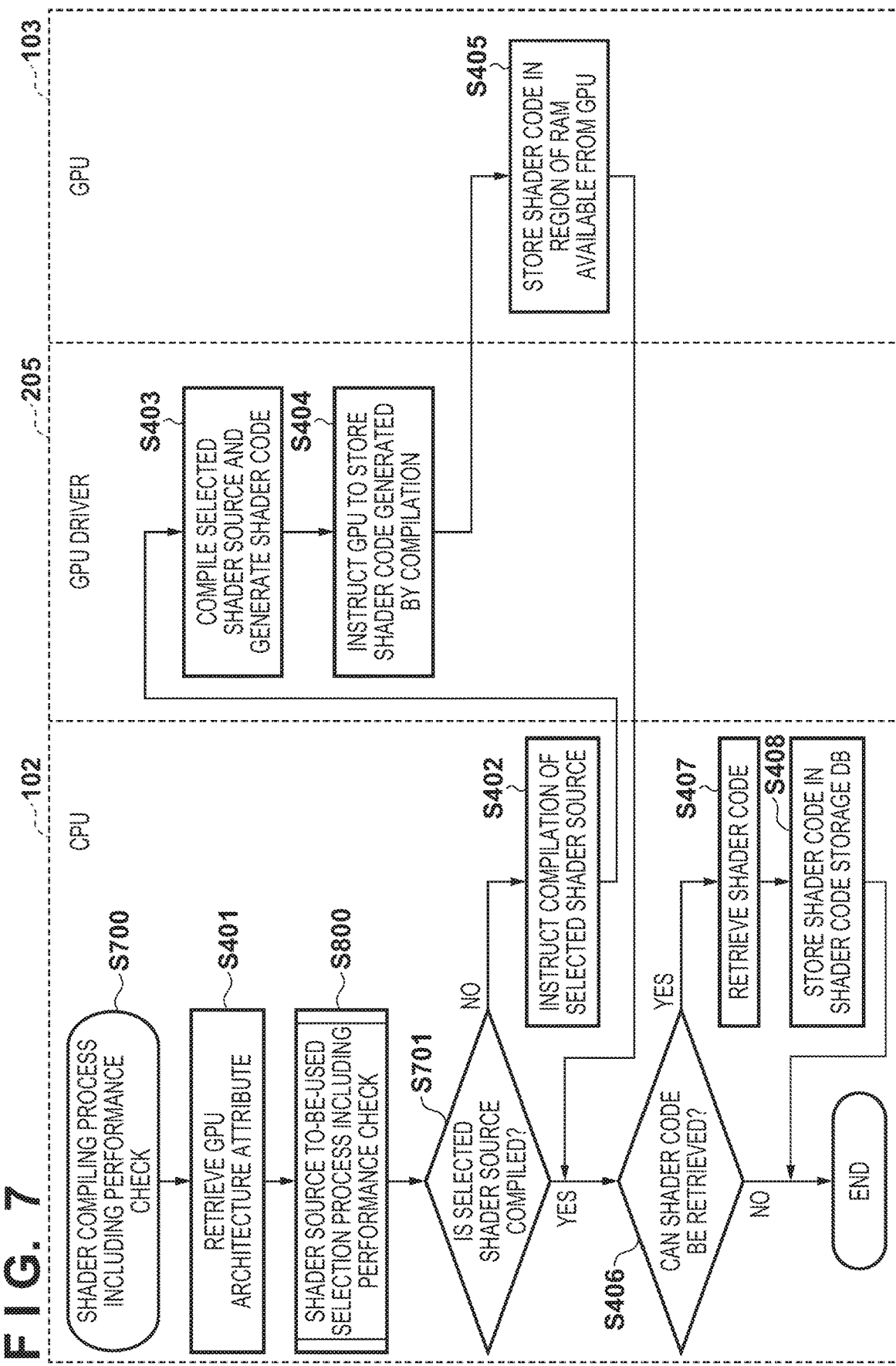
FIG. 7 is a flowchart of a shader compiling process according to a Second Embodiment.

A shader compiling process according to the present embodiment is described with reference to FIG. 7. FIG. 7 corresponds to the shader compiling process of FIG. 4 described in the First Embodiment, and therefore only the differences are described below. The processes whose contents are identical to those of FIG. 4 are denoted with the same reference numerals.

After retrieving the actual GPU architecture attribute at S401, the shader source selection processing unit 203 performs a shader source to-be-used selection process including a performance check. Details of this process will be described later with reference to FIG. 8. After the process of this step, it proceeds to S701.

At S701, the shader source selection processing unit 203 determines whether the shader source selected in the shader source to-be-used selection process (S800) has been compiled. In accordance with a determination that the selected shader source has been compiled (YES at S701), then it proceeds to S406. In accordance with a determination that the selected shader source has not yet been compiled (NO at S701), then it proceeds to S402. The subsequent processes are identical to those of FIG. 4 of the First Embodiment, and therefore the detailed description thereof is omitted.

Shader Source to-be-Used Selection Process

Figure 8:
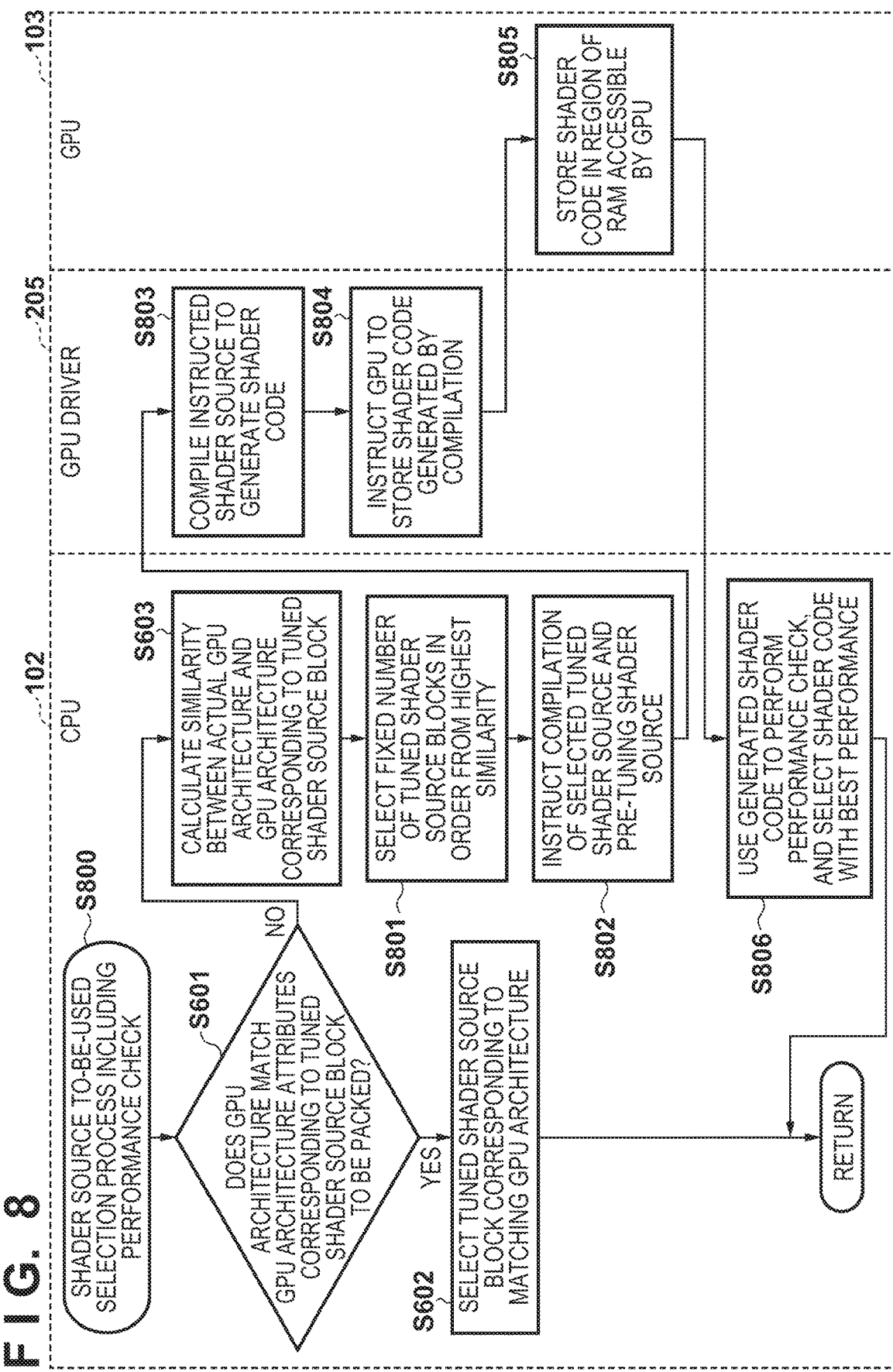
FIG. 8 is a flowchart of a shader to-be-used selection process according to the Second Embodiment.

Next, a shader source to-be-used selection process according to the present embodiment is described in detail with reference to FIG. 8. FIG. 8 corresponds to the shader compiling process of FIG. 6 described in the First Embodiment, and therefore only the differences are described below. The processes whose contents are identical to those of FIG. 8 are denoted with the same reference numerals. Note that in the shader source to-be-used selection process of the First Embodiment, the CPU 102 is the main processing component, but in the present embodiment, the GPU driver 205 and the GPU 103 perform the processing in cooperation with each other.

After the process of S603, at S801, the shader source selection processing unit 203 uses the similarity calculated at S603 to select a prescribed number of tuned shader source blocks in descending order of the similarity. For example, a list may be configured to be generated, in which a prescribed number of tuned shader source blocks are listed in descending order of the similarity. Further, the value used as a prescribed number may be defined in advance and may be stored in the storage unit 110 or the like. Note that the tuned shader source having a similarity equal to or smaller than a predetermined threshold may be configured to be not selected even when the number is smaller than the prescribed number in a case where the similarity of the tuned shader source is equal to or smaller than the predetermined threshold.

At S802, the shader source selection processing unit 203 instructs the GPU driver 205 to compile the pre-tuning shader source blocks and the tuned shader source blocks selected at S801 for the shader code output.

At S803, the shader source compilation processing unit 206 of the GPU driver 205 compiles all the shader source blocks instructed by the shader source selection processing unit 203.

At S804, the shader source compilation processing unit 206 instructs the GPU 103 to store all the shader code blocks generated at S803 in the GPU 103. At this time, the shader source compilation processing unit 206 passes the generated shader code to the GPU 103.

At S805, the GPU 103 stores, in the GPU accessible region 201 in the RAM 105, all the shader code blocks instructed to be stored by the GPU driver 205. After the storage of the instructed shader code is completed, the GPU 103 notifies it to the CPU 102.

In this embodiment, the tuned shader source blocks and the pre-tuning shader source blocks are collectively compiled in the step of S803. However, in view of the size of the RAM 105 available for the GPU 103, the compiling shader source blocks may be divided or individually compiled until the processes of the subsequent performance check.

At S806, the shader source selection processing unit 203 performs a performance check using the shader code blocks corresponding to the generated pre-tuning shader source blocks and tuned shader source blocks. The shader source selection processing unit 203 selects the shader code that provides the highest performance among them as the code to be used in the subsequent processes. The method of the performance check here is not limited, and any method that can be applied to each shader source may be adopted. For example, a predetermined processing may be executed to make a determination based on the resources consumed and the time required for the processing and the like. Further, the evaluation for the performance may be an absolute evaluation using a predetermined threshold, or a relative evaluation between each pair of the shader source blocks. Then, this process flow is terminated, and it proceeds to S701 of FIG. 7.

Figure 9:
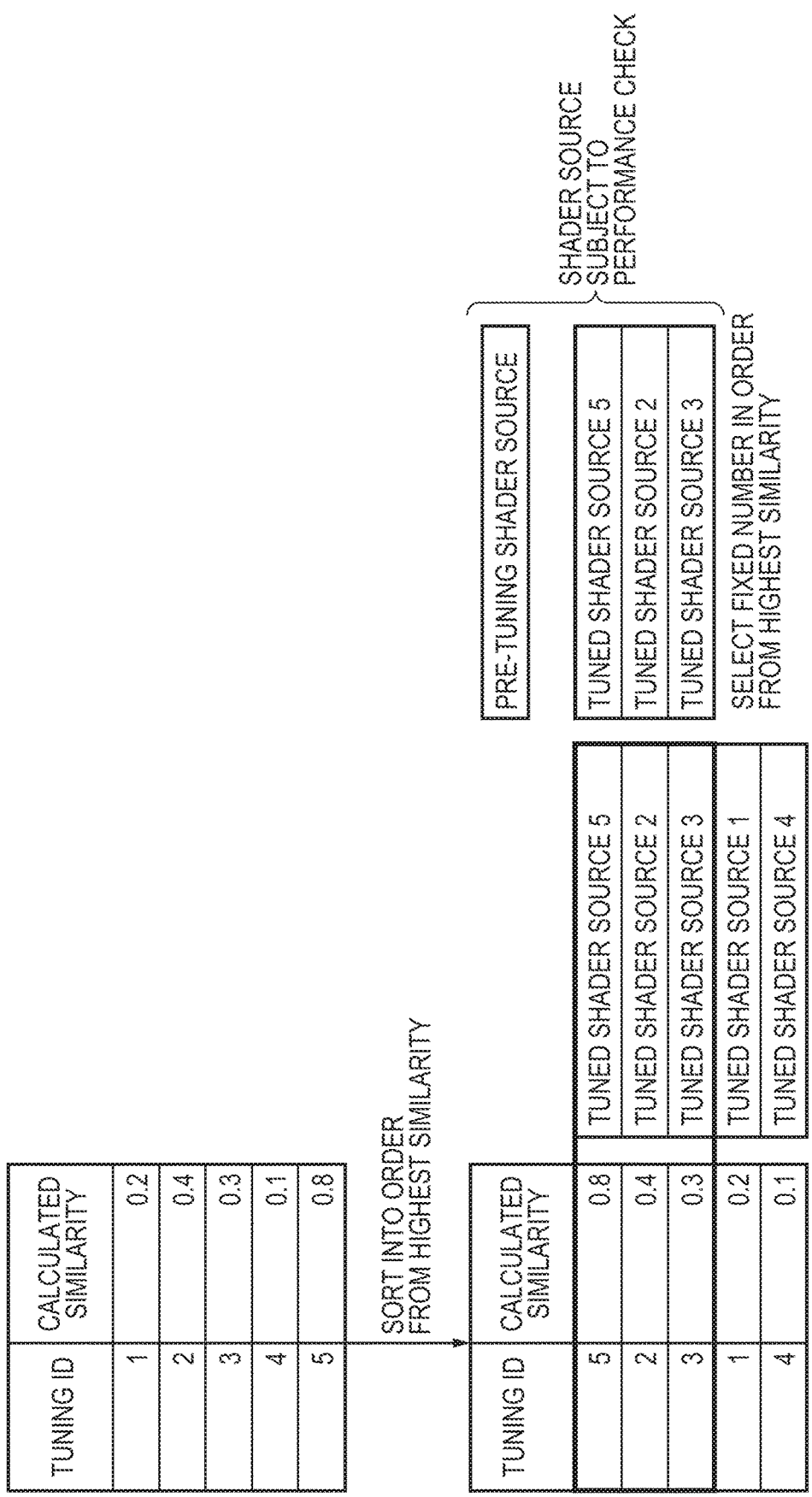
FIG. 9 is a diagram for describing the shader to-be-used selection process according to the Second Embodiment.

Now, the flow of the shader source to-be-used selection process illustrated in FIG. 8 is described with reference to FIG. 9 mainly from the perspective of the flow of data. FIG. 9 illustrates an example where there are five tuned shader source blocks in the shader source storage DB 208. First, the shader source selection processing unit 203 selects a prescribed number of tuned shader source blocks in descending order of the similarity at S801. FIG. 9 illustrates a state where the higher three tuned shader source blocks are selected. In FIG. 9, sorting is performed to select tuned shader source blocks with high similarity, but it is not absolutely necessary to sort unwanted portions, and other methods may be used as long as a prescribed number of tuned shader source blocks having higher similarities can be obtained.

In FIG. 9, the shader source blocks that are subjected to the performance check include a pre-tuning shader source block in addition to three tuned shader source blocks of tuning IDs "5", "2" and "3". As a result, in the example of FIG. 9, the shader source selection processing unit 203 narrows the number of the shader source blocks that are subjected to the performance check, to four.

Note that an increase in the selected number of the tuned shader source blocks leads to an increase in the time required for the performance check. In view of this, the number of the shader code blocks used for the performance check may be dynamically changed in accordance with the number of types of shaders to be used and the elapsed time.

In addition to the effects of the First Embodiment, the present embodiment can prevent cases where the performance is degraded. At the same time, the time required for the performance check can be reduced as much as possible, and the impact on usability can be reduced.

Third Embodiment

In the shader source to-be-used process (S400) according to the First Embodiment, a method of calculating the similarity between the actual GPU architecture attribute and the GPU architecture attribute corresponding to each packed tuned shader source block is described. However, when using a tuned shader source block selected to improve the performance by use of the similarity, the instruction length of the shader code after the compilation may become longer than when the pre-tuning shader source is performed. This is because the loop unwinding, function inline expansion, and the like that are performed as the source code tuning process may act in a direction that increases the size of the shader code after the compilation.

On the other hand, the GPU 103 has an upper limit on the maximum instruction length that is the size of the shader code that can be processed. Also, the maximum instruction length that is the size of the shader code varies depending on the GPU 103. When the maximum instruction length is exceeded, the GPU driver 205 may notify that the compilation cannot be performed in the processing of the shader source compilation processing unit 206. Further, the shader code generated by the compilation may not fall within the maximum cache length that can be stored in the GPU cache 212. In this case, the operation may become extremely slow, or may differ from that of the case where the output result of the GPU 103 is within the maximum cache length.

In view of this, the present embodiment describes a method of selecting shader source to be used in consideration of the case where the maximum instruction length or the maximum cache length is exceeded. Although the following flowchart illustrates an example in which the maximum instruction length is taken into account, the same processing can be applied to the instruction cache length.

Processing Sequence

Shader Compiling Process

Figure 10:
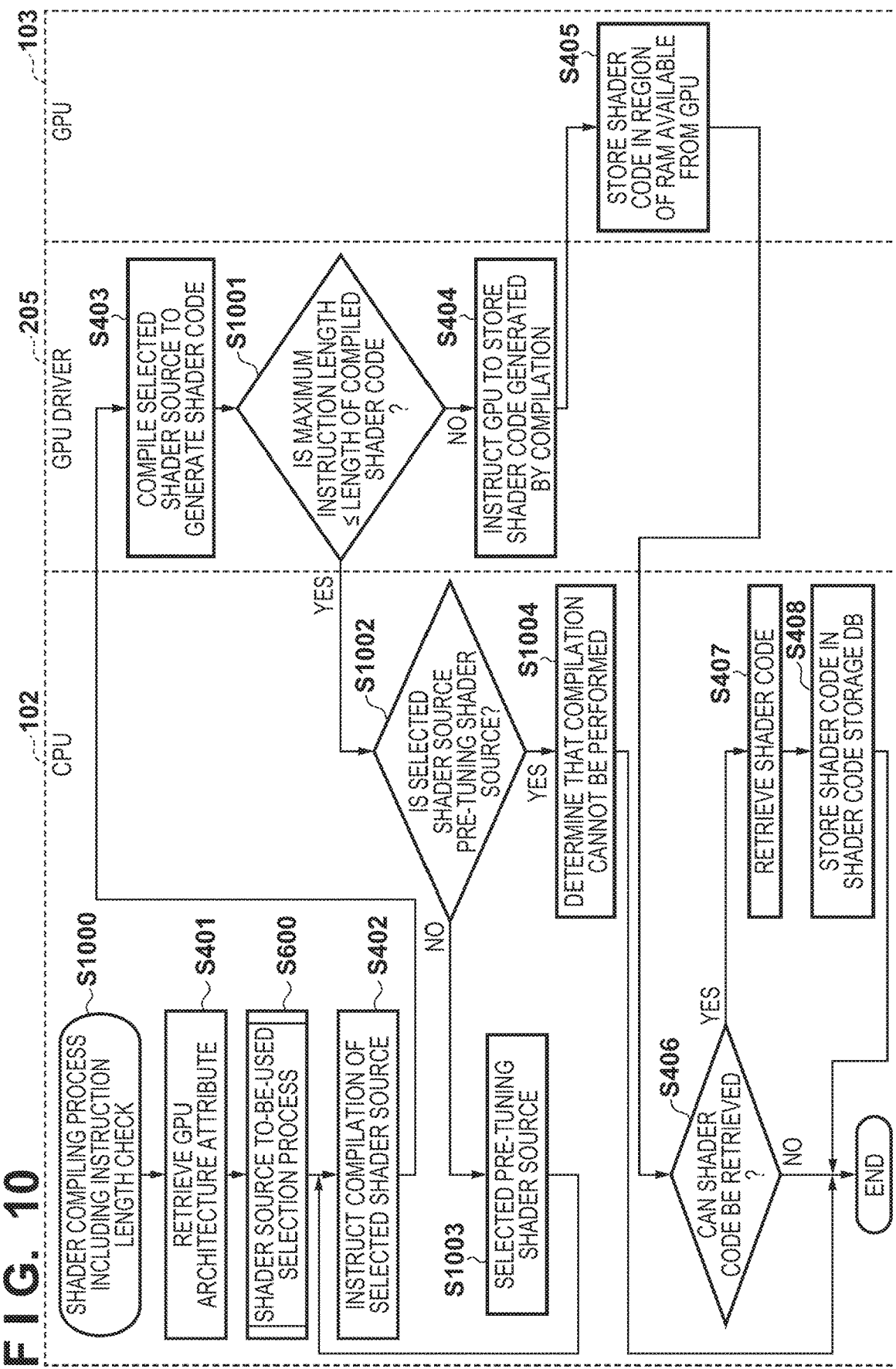
FIG. 10 is a flowchart of a shader compiling process according to a Third Embodiment.

A shader compiling process according to the present embodiment is described with reference to FIG. 10. FIG. 10 corresponds to the shader compiling process of FIG. 4 described in the First Embodiment, and therefore only the differences are described below. The processes whose contents are identical to those of FIG. 4 are denoted with the same reference numerals.

After generating the shader code at S403, at S1001, the GPU driver 205 determines whether the size of the generated shader code exceeds the maximum instruction length of the GPU 103. Here, the information of the maximum instruction length of the GPU 103 may configured to be retrieved in advance or be queried to the GPU 103. When the size of the shader code is equal to or greater than the maximum instruction length (YES at S1001), then it transitions to S1002. When the size of the shader code is smaller than the maximum instruction length (NO at S1001), then it transitions to S404. The processes after S404 are identical to those described in the First Embodiment, and therefore descriptions thereof will be omitted.

At S1002, the shader source selection processing unit 203 determines whether the shader source compiled at S403 is pre-tuning shader source. When the shader source is a pre-tuning shader source (YES at S1002), then it transitions to S1004. When the shader source is tuned shader source (NO at S1002), then it transitions to S1003.

At S1003, the shader source selection processing unit 203 selects a pre-tuning shader source block in which the size of the shader code is assumed to be smaller among the plurality of pre-tuning shader source blocks. In other words, a shader source block in which the effect of compressing the size of the shader code is high is selected. In the selection method here, the sizes of the shader source blocks before the compilation may be compared to make the selection based on the result of the comparison. When there is only one unprocessed pre-tuning shader source block, that shader source code is selected. Then, it transitions to S402. As a result, the shader source selection processing unit 203 attempts to perform compilation once again using the pre-tuning shader source. Note that, in a case where a plurality of shader source blocks to-be-used are selected, the replacement to pre-tuning shader source is repeated until the length of the shader code becomes smaller than the maximum instruction length or until the processing on all of the shader source blocks to-be-used is completed.

At S1004, the shader source selection processing unit 203 determines that the instruction word length cannot be further shortened for the selected shader source, and that the compilation cannot be performed. Then, this process flow is terminated, and it transitions to S302 of FIG. 3. In accordance with a determination that the compilation cannot be performed, a predetermined error display or warning display may be provided to the user, for example.

In accordance with the present embodiment, it is possible to select the shader source to be used in consideration of the case where the shader code exceeds the maximum instruction length or the maximum cache length. Thus, even with tuned shader source having an instruction length that cannot be processed by the GPU 103, the process can be proceeded by selecting the shader source having a shorter instruction length.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-099796, filed May 24, 2018, which is hereby incorporated by reference herein in its entirety.

What is claimed is:

1. An information processing device comprising:
a memory storing a program;
a first Graphics Processing Unit (GPU); and
a Central Processing Unit (CPU) that implements the program to execute a plurality of tasks, including:
a retrieving task that retrieves an instruction set including a first source code block that is pre-tuned, a plurality of second source code blocks obtained by tuning the first source code block for each of a plurality of GPUs of different types, and attribute information of the plurality of GPUs respectively corresponding to the plurality of second source code blocks;
a calculating task that calculates similarities between attribute information of the first GPU and each of the attribute information of the plurality of GPUs respectively corresponding to the plurality of second source code blocks;

a determining task that determines whether a highest similarity, among the calculated similarities, is equal to or greater than a predetermined threshold;

a selecting task that selects a source code, from among the first source code block and the plurality of second source code blocks, corresponding to:
   one of the plurality of second source code blocks corresponding to the highest similarity, in a case where the highest similarity is equal to or greater than the predetermined threshold; and
   the first source code block, in a case where the highest similarity is smaller than the predetermined threshold;

a compiling task that compiles the selected source code block to generate a compiled code for the first GPU; and an executing task that causes the first GPU to execute the generated compiled code.

2. The information processing device according to claim 1, wherein:
the plurality of tasks include a storing task that stores the generated compiled code in a storage device,
wherein the retrieving task, the calculating task, the determining task, the selecting task, the compiling task, and the executing task are executed in a case where the generated compiled code has not yet been stored in the storage device.

3. The information processing device according to claim 1, wherein, in a case where the generated compiled code exceeds an instruction cache length or a maximum instruction length of the first GPU, the selecting task selects another source code, from among the first source code block and the plurality of second source code blocks, and the compiling task compiles the selected another source code block.

4. A method of controlling an information processing device including a first Graphics Processing Unit (GPU), the method comprising:
retrieving an instruction set including a first source code block that is pre-tuned, a plurality of second source code blocks obtained by tuning the first source code block for each of a plurality of GPUs of different types, and attribute information of the plurality of GPUs respectively corresponding to the plurality of second source code blocks;
calculating similarities between attribute information of the first GPU and each of the attribute information of the plurality of GPUs respectively corresponding to the plurality of second source code blocks;
determining whether a highest similarity, among the calculated similarities, is equal to or greater than a predetermined threshold;
selecting a source code, from among the first source code block and the plurality of second source code blocks, corresponding to:
   one of the plurality of second source code blocks corresponding to the highest similarity, in a case where the highest similarity is equal to or greater than the predetermined threshold; and
   the first source code block, in a case where the highest similarity is smaller than the predetermined threshold;
compiling the selected source code block to generate a compiled code for the first GPU; and
causing the first GPU to execute the generated compiled code.

5. A non-transitory computer readable medium storing a program executable by a Central Processing Unit (CPU) of an information processing device that comprises the CPU and a first Graphics Processing Unit (GPU) to execute a method comprising:
retrieving an instruction set including a first source code block that is pre-tuned, a plurality of second source code blocks obtained by tuning the first source code block for each of a plurality of GPUs of different types, and attribute information of the plurality of GPUs respectively corresponding to the plurality of second source code blocks;
calculating similarities between attribute information of the first GPU and each of the attribute information of the plurality of GPUs respectively corresponding to the plurality of second source code blocks;
determining whether a highest similarity, among the calculated similarities, is equal to or greater than a predetermined threshold;
selecting a source code, from among the first source code block and the plurality of second source code blocks, corresponding to:
   one of the plurality of second source code blocks corresponding to the highest similarity, in a case where the highest similarity is equal to or greater than the predetermined threshold; and
   the first source code block, in a case where the highest similarity is smaller than the predetermined threshold;
compiling the selected source code block to generate a compiled code for the first GPU; and
causing the first GPU to execute the generated compiled code.

* * * * *